(12) United States Patent
Chen et al.

(10) Patent No.: US 12,260,613 B2
(45) Date of Patent: Mar. 25, 2025

(54) ELECTRONIC DEVICE AND METHOD FOR RECOGNIZING IMAGES BASED ON TEXTURE CLASSIFICATION

(71) Applicant: HON HAI PRECISION INDUSTRY CO., LTD., New Taipei (TW)

(72) Inventors: I-Hua Chen, New Taipei (TW); Chin-Pin Kuo, New Taipei (TW); Wei-Chun Wang, New Taipei (TW); Tzu-Chen Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 474 days.

(21) Appl. No.: 17/581,934

(22) Filed: Jan. 23, 2022

(65) Prior Publication Data

US 2022/0237893 A1 Jul. 28, 2022

(30) Foreign Application Priority Data

Jan. 23, 2021 (CN) .......................... 202110094532.6

(51) Int. Cl.
*G06V 10/764* (2022.01)
*G06T 7/11* (2017.01)
(Continued)

(52) U.S. Cl.
CPC .............. *G06V 10/764* (2022.01); *G06T 7/11* (2017.01); *G06T 7/41* (2017.01); *G06V 10/449* (2022.01);
(Continued)

(58) Field of Classification Search
None
See application file for complete search history.

(56) References Cited

U.S. PATENT DOCUMENTS

2010/0067799 A1* 3/2010 Liu ...................... G06V 10/507
382/190
2017/0236283 A1* 8/2017 Lambin ................ A61B 5/7275
382/131
(Continued)

FOREIGN PATENT DOCUMENTS

CN 110929787 3/2020
CN 112132781 12/2020

OTHER PUBLICATIONS

Chen et al. CN 112132781 MAchine Translation by WIPO (Year: 2020).*

*Primary Examiner* — Randolph I Chu
(74) *Attorney, Agent, or Firm* — ScienBiziP, P.C.

(57) ABSTRACT

A method for recognizing different object-categories within images based on texture classification of the different categories, which is implemented in an electronic device, includes extracting texture features from block images segmented from original images according to at least one Gabor filter; determining a grayscale level co-occurrence matrix of each block image according to the texture features; calculating texture feature statistics of each block image according to the grayscale level co-occurrence matrix; training and generating an object recognition model using the texture features and the texture feature statistics; and recognizing and classifying at least one object in original image according to the object recognition model.

14 Claims, 3 Drawing Sheets

(51) Int. Cl.
  *G06T 7/41*    (2017.01)
  *G06V 10/44*   (2022.01)
  *G06V 10/54*   (2022.01)
  *G06V 10/774*  (2022.01)

(52) U.S. Cl.
  CPC ............ *G06V 10/54* (2022.01); *G06V 10/774* (2022.01); *G06T 2207/20021* (2013.01); *G06T 2207/20081* (2013.01)

(56) References Cited

U.S. PATENT DOCUMENTS

| | | | |
|---|---|---|---|
| 2018/0189947 A1* | 7/2018 | Tadayyon | A61B 8/085 |
| 2020/0187790 A1* | 6/2020 | Milner | A61B 5/0084 |
| 2020/0297323 A1* | 9/2020 | Czarnota | G06T 7/41 |
| 2021/0058547 A1* | 2/2021 | Puttamalla | H04N 23/60 |
| 2021/0312232 A1* | 10/2021 | Tensmeyer | G06N 3/084 |
| 2022/0208384 A1* | 6/2022 | Hong | G16H 30/40 |
| 2023/0083484 A1* | 3/2023 | Milner | A61B 5/0066 |
| | | | 600/301 |
| 2023/0281974 A1* | 9/2023 | Ramamonjison | G06V 10/764 |
| | | | 382/157 |
| 2024/0241924 A1* | 7/2024 | Zadeh | G06N 3/084 |

* cited by examiner

ELECTRONIC DEVICE AND METHOD FOR RECOGNIZING IMAGES BASED ON TEXTURE CLASSIFICATION

CROSS-REFERENCE TO RELATED APPLICATIONS

This application claims priority to Chinese Patent Application No. 202110094532.6 filed on Jan. 23, 2021, filed in China National Intellectual Property Administration, the contents of which are incorporated by reference herein.

FIELD

The subject matter herein generally relates to blockchain, and particularly to an electronic device and a method for recognizing images based on texture classification.

BACKGROUND

Machine learning, pattern recognition, image processing etc., are widely used in image recognition, objects in images can be quickly and accurately classified with computing power of computers. However, if the image includes multiple objects of different categories, for example, an image of plants can include flowers or leaves of different sizes, the multiple objects in the image cannot be effectively classified at the same time, which results in lower accuracy and efficiency of image recognition.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
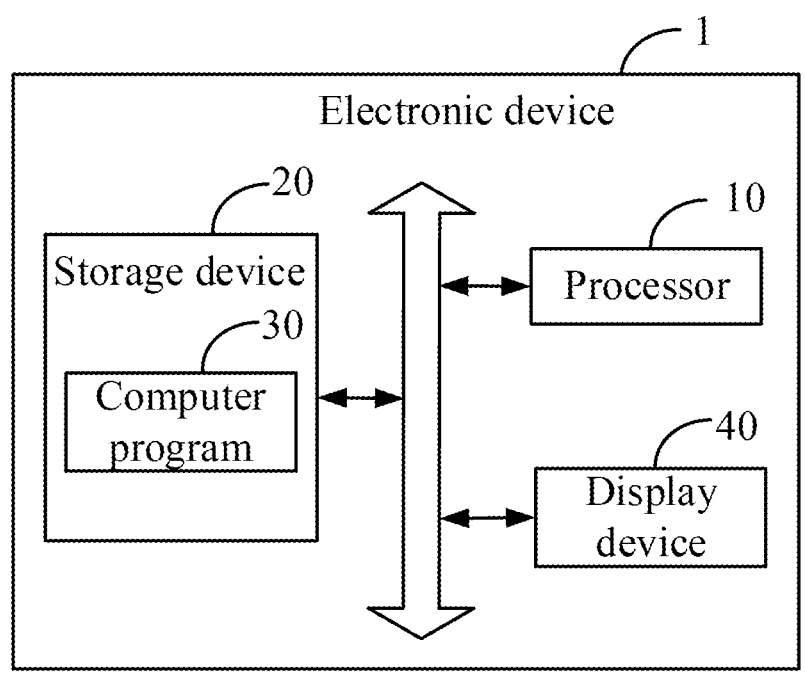
FIG. 1 is a block diagram of an embodiment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, an electronic device (electronic device 1) is illustrated. In one embodiment, the electronic device 1 can be a personal computer, a server, and the like, the server can be a single server, a server cluster, or a cloud server. The network of the electronic device 1 includes, but is not limited to, Internet, wide area network, metropolitan area network, local area network, and virtual private network.

The electronic device 1 includes, but is not limited to, a processor 10, a storage device 20, a computer program 30, and a display device 40. The computer program 30 may be executed by the processor 10 to implement a method for recognizing images based on texture classification. FIG. 1 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various categories of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

The display device 40 can be an LCD (liquid crystal display) or an OLED (Organic Light Emitting Diode) screen.

Figure 2:
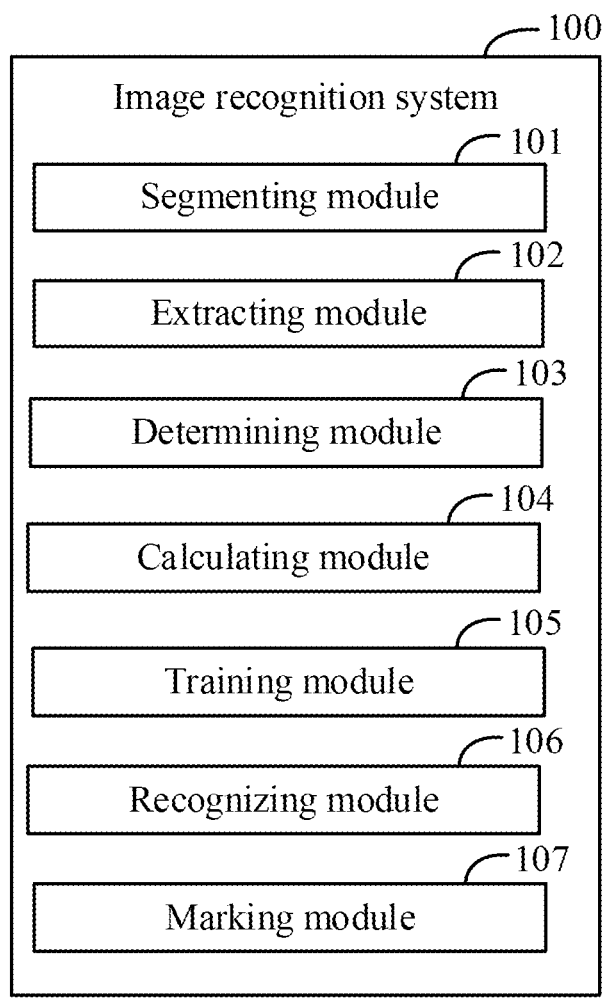
FIG. 2 is a block diagram of an embodiment of an image recognition system according to the present disclosure.

As illustrated in FIG. 2, the electronic device 1 runs an image recognition system 100. The image recognition system 100 at least includes a segmenting module 101, an extracting module 102, a determining module 103, a calculating module 104, a training module 105, a recognizing module 106, and a marking module 107. The modules 101-107 can be collections of software instructions stored in the storage device 20 of the electronic device 1 and executed by the processor 10. The modules 101-107 also can include functionality represented by hardware or integrated circuits, or by software and hardware combinations, such as a special-purpose processor or a general-purpose processor with special-purpose firmware.

The segmenting module 101 is used to segment each of original images showing a number of objects with a known category into a number of block images.

In one embodiment, the segmenting module 101 segments each of a number of the original images showing a number of object with a known category into a number of block image by applying a threshold segmentation method.

In detail, the segmenting module 101 presets a number of pixel ranges, determines the pixel range into which each pixel value of the original image falls, classifies the pixels of the image according to the pixel value and the determined pixel range, so as to separate different objects (e.g., foreground and background) according to the classified pixels in the image.

In one embodiment, the original image may be an image of plants, and the object categories may include large-petalled flowers, small-petalled flowers, and leaves of flowers.

The extracting module 102 is used to extract features of texture of each block image according to at least one Gabor filter.

In detail, the extracting module 102 determines the number of the Gabor filters according to the filter parameters, and forms a Gabor filter group. In one embodiment, the filter parameters include the number of filter scales and the number of directions of the Gabor filter. For example, if the number of filter scales is 4 and the number of directions is 6, then a Gabor filter group including 4*6 (24) filters may be formed.

The extracting module 102 further outputs a texture image of each block image by the Gabor filter group performing spatial convolution calculation on each block image. In one embodiment, the Gabor filter group performs spatial convolution calculation based on a two-dimensional Gabor function to obtain a texture image of each block image.

In one embodiment, a complex number of the two-dimensional Gabor function is expressed by:

$$g(x, y; \lambda, \theta, \varphi, \sigma, \gamma) = \exp\left(-\frac{x'^2 + \gamma^2 y'^2}{2\sigma^2}\right) \exp\left(i\left(2\pi \frac{x'}{\lambda} + \varphi\right)\right); \quad \text{equation (1)}$$

A real part of the two-dimensional Gabor function is expressed by:

$$g(x, y; \lambda, \theta, \varphi, \sigma, \gamma) = \exp\left(-\frac{x'^2 + \gamma^2 y'^2}{2\sigma^2}\right) \cos\left(i\left(2\pi \frac{x'}{\lambda} + \varphi\right)\right); \quad \text{equation (2)}$$

An imaginary part of the two-dimensional Gabor function is expressed by:

$$g(x, y; \lambda, \theta, \varphi, \sigma, \gamma) = \exp\left(-\frac{x'^2 + \gamma^2 y'^2}{2\sigma^2}\right) \sin\left(i\left(2\pi \frac{x'}{\lambda} + \varphi\right)\right). \quad \text{equation (3)}$$

In equations (1)-(3), x'=x cos θ+y sin θ, y'=x sin θ+y cos θ.

The extracting module 102 further generates a feature vector according to the texture image of each block image as the texture feature of the block image.

In one embodiment, the extracting module 102 calculates an average grayscale value of each texture images output by the Gabor filter group, and then generates the feature vector according to the average grayscale value.

The determining module 103 is used to determine a grayscale level co-occurrence matrix of each block image according to the extracted texture features.

In detail, the determining module 103 converts each block image into a grayscale image, a resolution of the grayscale image may be N*N, sets parameters of the grayscale co-occurrence matrix, and generates the grayscale level co-occurrence matrix according to the grayscale image and the parameters. In one embodiment, the parameters at least include a direction, an offset, and an order. The direction may include 0°, 45°, 90°, and 135°, the offset is a step distance, and the order may be the same as the order of the grayscale image, such as a second order. Preferably, the step distance may be 1, the step distance may be determined according to a center pixel and the pixels around the center pixel of the grayscale image.

The calculating module 104 is used to calculate texture feature statistics of each block image according to the grayscale level co-occurrence matrix.

In one embodiment, the texture feature statistics may include energy, contrast, correlation, entropy, uniformity, variance, sum average, sum variance, sum entropy, difference variance, difference average, difference entropy, related information measure, and maximum correlation coefficient. Preferably, the texture feature statistics include energy, contrast, correlation, and entropy.

In detail, the calculating module 104 calculates the energy $$ASM = \sum_i \sum_j P(i, j)^2 \qquad \text{(equation (4))}$$

of the texture features of each block image according to the grayscale level co-occurrence matrix. The calculating module 104 further calculates the contrast $$CON = \sum_i \sum_j (i-j)^2 P(i, j) \qquad \text{(equation (5))}$$

of the texture features of each block image according to the grayscale level co-occurrence matrix. The calculating module 104 further calculates the correlation $$CORR = \sum_i \sum_j \frac{(ij)P(i, j) - \mu_x \mu_y}{\sigma_x \sigma_y} \qquad \text{(equation (6))}$$

of the texture features of each block image according to the grayscale level co-occurrence matrix. The calculating module 104 further calculates the entropy $$ENT = \sum_i \sum_j P(i, j) \log P(i, j) \qquad \text{(equation (7))}$$

of the texture features of each block image according to the grayscale level co-occurrence matrix.

The training module 105 is used to generate an object recognition model by performing training using the texture features and the texture feature statistics.

In one embodiment, the training module 105 determines the texture features and the texture feature statistics corresponding to each of the object categories as a training set of a classifier, trains the classifier according to the training set, and determines the trained classifier as the object recognition model. For example, the training set includes the texture features and the texture feature statistics of large-petalled flowers, the texture features and the texture feature statistics of small-petalled flowers, and the texture features and the texture feature statistics of leaves of flowers.

In one embodiment, the classifier may be a K-Nearest Neighbor (KNN) classifier. The training module 105 determines the training set as a feature space of the K nearest neighbor classifier.

In other embodiments, the classifier may also be a Support Vector Machine (SVM) classifier. The training module 105 finds a best separation hyperplane in the feature space of the support vector machine classifier, to maximize an interval between the positive and negative sample of the training set, thereby completing the training of the support vector machine classifier. In other embodiments, the classifier may also be a neural network model.

The recognizing module 106 is used to recognize and classify at least one object in an image to be recognized according to the object recognition model.

In one embodiment, the recognizing module 106 converts the image into a grayscale image, extracts the texture features and texture feature statistics of the grayscale image, recognizes at least one object in the grayscale image, and classifies the recognized object to a category of the object according to the texture features, texture feature statistics, and the object recognition model. The object recognition model may recognize and classify the at least one object with texture features in the image, so as to recognize a number of objects in the image.

In one embodiment, the object recognition model determines that a category of the object with texture features is the same as the most of the K nearest training samples in the feature space. For example, a value of K may be 5, the image may be an image of a plant, and the object recognition model is a K nearest neighbor classifier trained and generated based on the texture features and texture feature statistics of large-petalled flowers, small-petalled flowers, and leaves of flowers. If the object recognition model determines that an object category of most of five nearest adjacent training samples in the feature space is a large-petalled flower, the recognizing module 106 determines that the object with the texture features is a large-petalled flower.

The marking module 107 is used to mark at least one classified object in the image according to the classified object category, and display the image with at least one marked object on the display device 40.

In one embodiment, the marking module 107 presets a mark corresponding to each object category, selects the corresponding preset mark according to the determined category of the object, and marks the corresponding objects in the image. The preset mark may be image frames of different shape and/or color.

Figure 3:
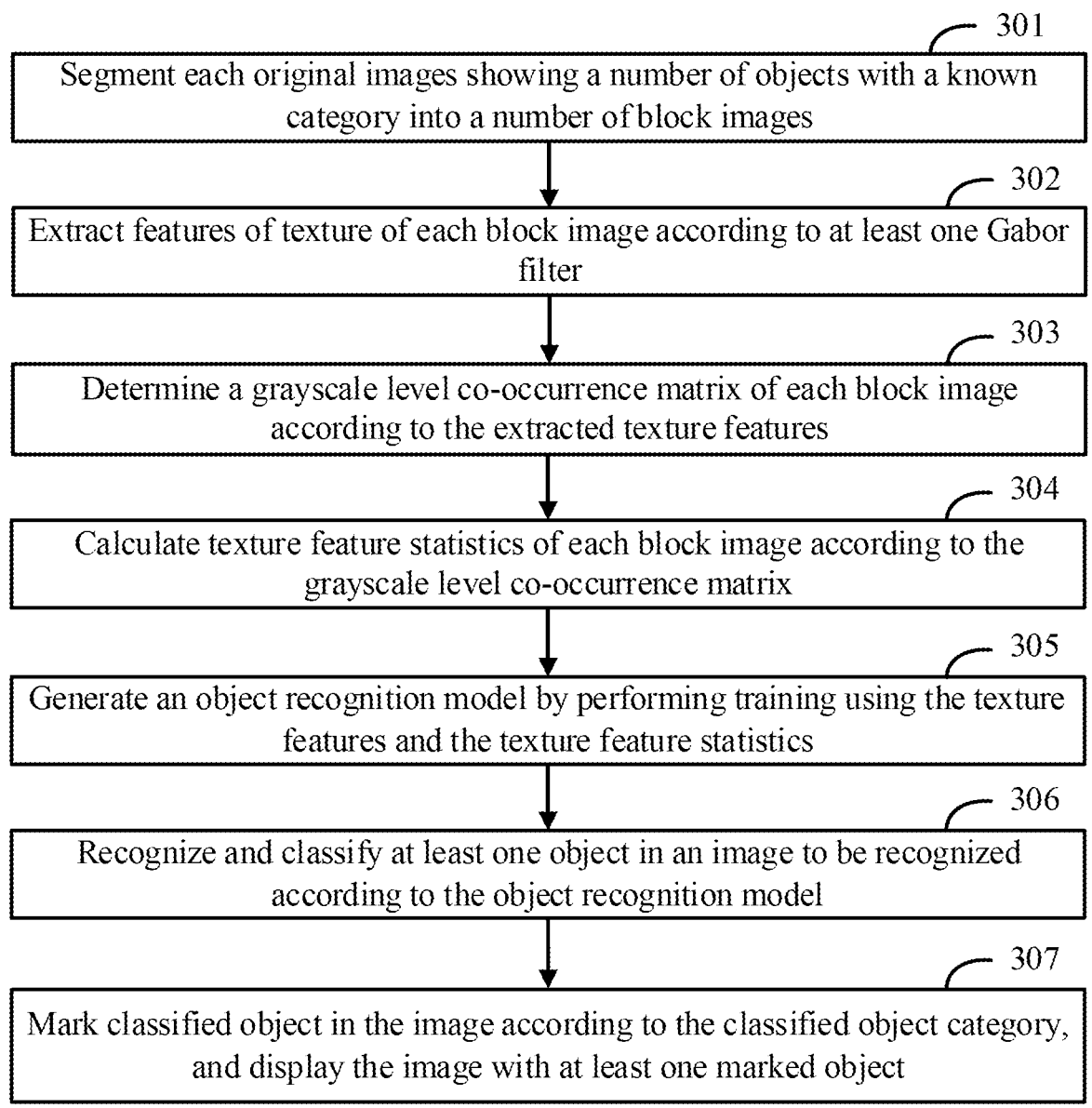
FIG. 3 illustrates a flowchart of an embodiment of a method for recognizing images based on texture classification according to the present disclosure.

FIG. 3 illustrates a flowchart of an embodiment of a method for recognizing images based on texture classification. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the order of blocks is for illustrated example only and the order of the blocks can be changed. Additional blocks may be added or fewer blocks may be utilized, without departing from this disclosure. The example method can begin at block 301.

At block 301, the segmenting module 101 segments each of original images showing a number of objects with a known category into a number of block images.

At block 302, the extracting module 102 extracts features of texture of each block image according to at least one Gabor filter.

At block 303, the determining module 103 determines a grayscale level co-occurrence matrix of each block image according to the extracted texture features.

At block 304, the calculating module 104 calculates texture feature statistics of each block image according to the grayscale level co-occurrence matrix.

At block 305, the training module 105 generates an object recognition model by performing training using the texture features and the texture feature statistics.

At block 306, the recognizing module 106 recognizes and classifying at least one object in an image to be recognized according to the object recognition model.

At block 307, the marking module 107 marks classified object in the image according to the classified object category, and displays the image with at least one marked object on the display device 40.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and storing instructions for execution by the at least one processor to cause the at least one processor to:
segment each of original images showing a plurality of objects with a known category into a plurality of block images;
extract features of texture of each of the plurality of block images according to at least one Gabor filter;
determine a grayscale level co-occurrence matrix of each of the plurality of block images according to the extracted features of texture;
calculate texture feature statistics of each of the plurality of block images according to the grayscale level co-occurrence matrix, wherein the texture feature statistics comprise energy, contrast, correlation, and entropy;
generate an object recognition model by performing training using the features of texture and the texture feature statistics; and
convert an image to be recognized into a grayscale image, extract texture features and texture feature statistics of the grayscale image, recognize and classify at least one object in the image to be recognized according to the texture features and the texture feature statistics of the grayscale image by the object recognition model.

2. The electronic device according to claim 1, wherein the at least one processor is further caused to:
mark at least one classified object in the image according to at least one classified object category; and
display the image with at least one marked object on a display device.

3. The electronic device according to claim 1, wherein the at least one processor is further caused to:
    determine the number of the Gabor filters according to filter parameters and form a Gabor filter group;
    output an image of texture of each of the plurality of block images by the Gabor filter group performing spatial convolution calculation on each of the plurality of block images; and
    generate a feature vector according to the image of texture of each of the plurality of block images as the features of texture of the block image.

4. The electronic device according to claim 1, wherein the at least one processor is further caused to:
    convert each of the plurality of block images into a grayscale image;
    set parameters of the grayscale co-occurrence matrix, wherein the parameters at least comprise a direction, an offset, and an order; and
    generate the grayscale level co-occurrence matrix according to the grayscale image and the parameters.

5. The electronic device according to claim 4, wherein the direction comprises 0°, 45°, 90°, and 135°, the offset is a step distance, and the order is the same as an order of the grayscale image.

6. The electronic device according to claim 1, wherein the at least one processor is further caused to:
    calculate the energy $$ASM = \sum_i \sum_j P(i, j)^2$$

of the features of texture of each block image according to the grayscale level co-occurrence matrix;
    calculate the contrast $$CON = \sum_i \sum_j (i - j)^2 P(i, j)$$

of the features of texture of each block image according to the grayscale level co-occurrence matrix;
    calculate the correlation $$CORR = \sum_i \sum_j \frac{(ij)P(i, j) - \mu_x \mu_y}{\sigma_x \sigma_y}$$

of the features of texture of each block image according to the grayscale level co-occurrence matrix; and
    calculate the entropy $$ENT = \sum_i \sum_j P(i, j) \log P(i, j)$$

of the features of texture of each block image according to the grayscale level co-occurrence matrix.

7. The electronic device according to claim 1, wherein the at least one processor is further caused to:
    generate a training set according to the features of texture and the texture feature statistics;
    train a classifier according to the training set; and
    determine the trained classifier to be the object recognition model.

8. A method for recognizing images based on texture classification implemented in an electronic device comprising:
    segmenting each of original images showing a plurality of objects with a known category into a plurality of block images;
    extracting features of texture of each of the plurality of block images according to at least one Gabor filter;
    determining a grayscale level co-occurrence matrix of each of the plurality of block images according to the extracted features of texture;
    calculating texture feature statistics of each of the plurality of block images according to the grayscale level co-occurrence matrix, the texture feature statistics comprising energy, contrast, correlation, and entropy;
    generating an object recognition model by performing training using the features of texture and the texture feature statistics; and
    converting an image to be recognized into a grayscale image, extracting texture features and texture feature statistics of the grayscale image, recognizing and classifying at least one object in the image to be recognized according to the texture features and the texture feature statistics of the grayscale image by the object recognition model.

9. The method according to claim 8, further comprising:
    marking at least one classified object in the image according to at least one classified object category; and
    displaying the image with at least one marked object on a display device.

10. The method according to claim 8, wherein extracting features of texture of each of the plurality of block images according to at least one Gabor filter comprises:
    determining the number of the Gabor filters according to filter parameters and forming a Gabor filter group;
    outputting an image of texture of each of the plurality of block images by the Gabor filter group performing spatial convolution calculation on each of the plurality of block images; and
    generating a feature vector according to the image of texture of each of the plurality of block images as the features of texture of the block image.

11. The method according to claim 8, wherein determining a grayscale level co-occurrence matrix of each of the plurality of block images according to the extracted features of texture comprises
    converting each of the plurality of block images into a grayscale image;
    setting parameters of the grayscale co-occurrence matrix, wherein the parameters at least comprise a direction, an offset, and an order; and
    generating the grayscale level co-occurrence matrix according to the grayscale image and the parameters.

12. The method according to claim 11, wherein the direction comprises 0°, 45°, 90°, and 135°, the offset is a step distance, and the order is the same as an order of the grayscale image.

13. The method according to claim 8, wherein calculating texture feature statistics of each of the plurality of block images comprises:
    calculating the energy $$ASM = \sum_i \sum_j P(i, j)^2$$

of the features of texture of each block image according to the grayscale level co-occurrence matrix;
calculating the contrast $$CON = \sum_i \sum_j (i-j)^2 P(i, j)$$

of the features of texture of each block image according to the grayscale level co-occurrence matrix;
calculating the correlation $$CORR = \sum_i \sum_j \frac{(ij)P(i, j) - \mu_x \mu_y}{\sigma_x \sigma_y}$$

of the features of texture of each block image according to the grayscale level co-occurrence matrix; and
calculating the entropy $$ENT = \sum_i \sum_j P(i, j) \log P(i, j)$$

of the features of texture of each block image according to the grayscale level co-occurrence matrix.

14. The method according to claim 8, wherein generating an object recognition model by performing training using the features of texture and the texture feature statistics comprises:
  generating a training set according to the features of texture and the texture feature statistics;
  training a classifier according to the training set; and
  determining the trained classifier to be the object recognition model.

* * * * *